United States Patent
Lu et al.

(10) Patent No.: US 11,412,428 B2
(45) Date of Patent: Aug. 9, 2022

(54) CELL HANDOVER METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Qianxi Lu, Dongguan (CN); Xin You, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/389,238

(22) Filed: Jul. 29, 2021

(65) Prior Publication Data
US 2021/0360497 A1    Nov. 18, 2021

Related U.S. Application Data

(63) Continuation of application No. PCT/CN2019/074030, filed on Jan. 30, 2019.

(51) Int. Cl.
*H04W 36/00* (2009.01)
*H04W 74/08* (2009.01)

(52) U.S. Cl.
CPC .. *H04W 36/00837* (2018.08); *H04W 36/0016* (2013.01); *H04W 36/0058* (2018.08); *H04W 74/0833* (2013.01)

(58) Field of Classification Search
None
See application file for complete search history.

(56) References Cited

U.S. PATENT DOCUMENTS

| 10,033,549 B2 | 7/2018 | Yamaguchi et al. |
| 2018/0220344 A1* | 8/2018 | Shaheen ............... H04W 4/60 |
| 2021/0120458 A1* | 4/2021 | Koskela ........... H04W 36/0016 |

(Continued)

FOREIGN PATENT DOCUMENTS

| CN | 101351029 A | 1/2009 |
| CN | 103841613 A | 6/2014 |

(Continued)

OTHER PUBLICATIONS

International Search Report issued in corresponding International Application No. PCT/CN2019/074030, dated Oct. 30, 2019, 25 pages.

(Continued)

*Primary Examiner* — Mohammad S Adhami
(74) *Attorney, Agent, or Firm* — Bayes PLLC (57) ABSTRACT

Provided are a cell handover method, a terminal device, and a network device that can implement cell handover in scenarios such as high-speed mobile scenarios and high-frequency deployment scenarios. The cell handover method includes receiving, by a terminal device, first configuration information sent from a network device serving a first cell. The first configuration information is used to instruct the terminal device to be handed over from the first cell to the second cell. The cell handover method further includes sending, by the terminal device, response information to the network device serving the first cell and/or the network device serving the second cell in response to the first configuration information.

15 Claims, 4 Drawing Sheets

(56) References Cited

U.S. PATENT DOCUMENTS

2021/0168678 A1* 6/2021 Deenoo ............... H04W 36/305
2021/0274404 A1* 9/2021 Koziol ................ H04W 36/305

FOREIGN PATENT DOCUMENTS

| CN | 108243468 A | 7/2018 |
|---|---|---|
| EP | 3562208 A1 | 10/2019 |
| EP | 3609231 A1 | 2/2020 |
| KR | 20180122935 A | 11/2018 |
| WO | 2018/172600 A1 | 9/2018 |
| WO | 2018/175721 A1 | 9/2018 |
| WO | 2018/184150 A1 | 10/2018 |

OTHER PUBLICATIONS

PCT Written Opinion of the International Searching Authority issued in corresponding International Application No. PCT/CN2019/074030, dated Oct. 30, 2019, 7 pages.
"New WID: NR mobility enhancements", Source: Intel Corporation, Agenda Item: 9.1.10, 3GPP TSG RAN Meeting #80 RP-181433, La Jolla, USA, May 21-May 25, 2018, 5 pages.
Extended European Search Report issued in corresponding European Application No. 19913228.3, dated Feb. 21, 2022, 15 pages.

* cited by examiner

CELL HANDOVER METHOD, TERMINAL DEVICE, AND NETWORK DEVICE

CROSS-REFERENCE TO RELATED APPLICATION

This application is a continuation application of International Application No. PCT/CN2019/074030, filed on Jan. 30, 2019, the entire contents of which are incorporated herein by reference.

BACKGROUND

Embodiments of the present disclosure relate to the field of communications, and more particularly, to a cell handover method, terminal device, and network device.

Cell handover is supported by a New Radio (NR) system. When a user who is using network services moves from a cell to another cell, or when it is necessary to ensure communication consecutiveness and service quality due to wireless transmission traffic load adjustment, activation operation and maintenance, equipment failure and the like, the system will hand over a communication link between the user and the previous cell to a new cell (that is, performing a handover procedure). However, in a high-speed mobile scenario and high-frequency deployment scenario, the handover is frequently performed and handover failure is easy to happen. How to implement cell handover under scenarios such as high-speed mobile scenario and high-frequency deployment scenario is an urgent problem to be solved.

SUMMARY

Embodiments of the present disclosure provide a cell handover method, terminal device and network device.

A first aspect provides a cell handover method, including receiving, by a terminal device, first configuration information sent from a network device serving a first cell, where the first configuration information is used to instruct the terminal device to be handed over from the first cell to a second cell; and sending, by the terminal device, response information to the network device serving the first cell and/or a network device serving the second cell in response to the first configuration information.

A second aspect provides a cell handover method, including sending, by a network device serving a first cell, first configuration information to a terminal device, where the first configuration information is used to instruct the terminal device to be handed over from the first cell to a second cell; and receiving, by the network device, response information sent from the terminal device, where the response information is used for indicating acceptance of the first configuration information.

A third aspect provides a terminal device configured to perform the method of the first aspect or various embodiments thereof.

In particular, the terminal device includes function modules configured to perform the method of the first aspect or various embodiments thereof.

A fourth aspect provides a network device configured to perform the method of the second aspect or various embodiments thereof.

In particular, the network device includes function modules configured to perform the method of the second aspect or various embodiments thereof.

A fifth aspect provides a terminal device including a processor and a memory. The memory is configured to store a computer program, and the processor is configured to call the computer program stored in the memory and run the computer program, to execute the method of the first aspect or various embodiments thereof.

A sixth aspect provides a network device including a processor and a memory. The memory is configured to store a computer program, and the processor is configured to call the computer program stored in the memory and run the computer program, to execute the method of the second aspect or various embodiments thereof.

A seventh aspect provides a chip used to execute the method of either the first aspect or the second aspect or various embodiments thereof.

In particular, the chip includes a processor. The processer calls a computer program from a memory and runs the computer program, to cause a device installed with the chip to execute the method of either the first aspect or the second aspect or various embodiments thereof.

An eighth aspect provides a computer-readable storage medium for storing a computer program that causes a computer to execute the method of either the first aspect or the second aspect or various embodiments thereof.

A ninth aspect provides a computer program product including program instructions that cause a computer to execute the method of either the first aspect or the second aspect or various embodiments thereof.

A tenth aspect provides a computer program that, when being executed on a computer, causes the computer to execute the method of either the first aspect or the second aspect or various embodiments thereof.

DETAILED DESCRIPTION

Technical solutions of the embodiments of the present disclosure will be described below in combination with the accompanying drawings of the embodiments of the present disclosure. Apparently, only a part of the embodiments, not all the embodiments of the present disclosure, are described. All other embodiments obtained, based on the embodiments described in the present disclosure, by those skilled in the art without paying creative efforts shall fall within the protection scope of the present disclosure.

Embodiments of the present disclosure can be applied to various communication systems, such as, a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an advanced long term evolution (LTE-A) system, a New Radio (NR) system, an evolution system of the NR system, a LTE-based access to unlicensed spectrum (LTE-U) system, a NR-based access to unlicensed spectrum (NR-U) system, an Universal Mobile Telecommunication System (UMTS), a Wireless Local Area Networks (WLAN) system, a Wireless Fidelity (WiFi) system, a next-generation communication system or other communication systems, etc.

Generally speaking, traditional communication systems support a limited number of connections and are easy to implement. However, with the development of communication technologies, mobile communication systems will support not only traditional communications, but also for example, Device to Device (D2D) communication, Machine to Machine (M2M) communication, Machine Type Communication (MTC), and Vehicle to Vehicle (V2V) communication, etc. Embodiments of the present disclosure can also be applied to these communication systems.

Optionally, the communication system in the embodiments of the present disclosure may be applied to a carrier aggregation (CA) scenario, a Dual Connectivity (DC) scenario, or a standalone (SA) network configuration scenario.

Spectrum to which embodiments of the present disclosure may be applied is not limited herein. For example, embodiments of the present disclosure may be applied to licensed spectrum or unlicensed spectrum.

Figure 1:
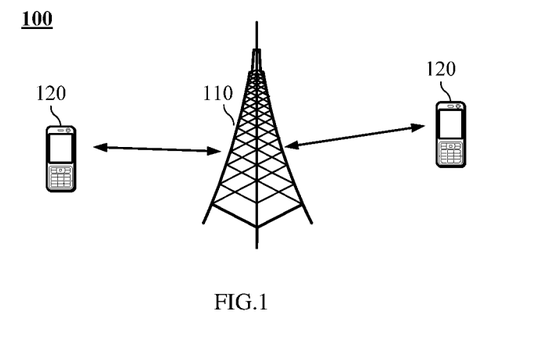
FIG. 1 is a schematic diagram illustrating a communication system architecture provided by an embodiment of the present disclosure.

For example, embodiments of the present disclosure are applied to a communication system 100 shown in FIG. 1. The communication system 100 can include a network device 110 that communicates with a terminal device 120 (or called as a communication terminal or a terminal). The network device 110 can provide communication coverage over a specific geographic area, and can communicate with terminal devices located in the coverage area.

FIG. 1 exemplarily illustrates one network device and two terminal devices. Optionally, the communication system 100 may include multiple network devices, and the number of terminal devices within the coverage of each network device may not be two, which is not limited in the embodiments of the present disclosure.

Optionally, the communication system 100 may further include other network entities such as a network controller and a mobility management entity, which is not limited in the embodiment of the present disclosure.

It should be understood that a device having communication functions in the network/system in the embodiments of the present disclosure may be referred to as a communication device. Taking the communication system 100 shown in FIG. 1 as an example, the communication device may include a network device 110 and a terminal device 120 having communication functions, and the network device 110 and the terminal device 120 may be specific devices described above, which will not be repeated here. The communication device may also include other devices in the communication system 100, such as the network controller, the mobile management entity and other network entities, which are not limited in the embodiments of the present disclosure.

Embodiments of the present disclosure are described in conjunction with a network device and a terminal device. The terminal device may also be referred to as User Equipment (UE), access terminal, subscriber unit, user station, mobile station, mobile device, remote station, remote terminal, mobile equipment, user terminal, terminal, wireless communication device, user agent or user device, etc. The terminal device can be a station (ST) in the WLAN, or can be a cellular phone, a cordless phone, a Session Initiation Protocol (SIP) phone, a wireless local loop (WLL) station, a Personal Digital Assistant (PDA) device, a handheld device with wireless communication capabilities, a computing device, or other processing device connected to wireless modems, an in-vehicle device, a wearable device, or a terminal device in a next-generation communication system such as NR network, or a terminal device in a future evolved public land mobile network (PLMN), and so on.

As an example but not a limitation, in embodiments of the present disclosure, the terminal device may be a wearable device. The wearable device can also be referred to as a wearable smart device, which is a general term for wearable devices for which intellectualized designs are made based on common wearable devices using wearable technologies, for example, glasses, gloves, watches, clothing and shoes. A wearable device is a portable device that is worn directly on a human body or integrated into the user's clothes or accessories. Wearable devices are not only hardware devices, but also have powerful functions through software support, data interaction, and cloud interaction. Generalized wearable smart devices are full-featured and large-sized, and can realize complete or partial functions without relying on smartphones, such as smart watches or smart glasses. Some wearable devices may only focus on a certain type of disclosure functions, and may cooperate with other devices such as smartphone, such as various smart bracelets and smart jewelry for physical sign monitoring.

The network device may be a device for communicating with a mobile device, and the network device may be an Access Point (AP) in WLAN, a Base Transceiver Station (BTS) in GSM or CDMA, or a NodeB (NB) in WCDMA, or an Evolutional Node B (eNB or eNodeB) in LTE, or a relay station or access point, or an in-vehicle device, a wearable device, and a network device (gNB) in an NR network or a network device in a future evolved public land mobile network (PLMN), and so on.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, a base station), the cell may belong to a macro base station or a base station corresponding to a small cell. The small cell here can include a metro cell, a micro cell, a pico cell, a femto cell, etc. These small cells have the characteristics of small coverage and low transmission power, and are suitable for providing high-speed data transmission services.

It should be understood that the NR system also supports the handover procedure as the LTE system does. When a user who is using network services moves from a cell to another cell, or when it is necessary to ensure communication continuity and service quality due to wireless transmission service load adjustment, activation operation and maintenance, equipment failure and the like, the system will hand over the communication link between the user and the previous cell to a new cell, that is, performing a handover procedure.

Figure 2:
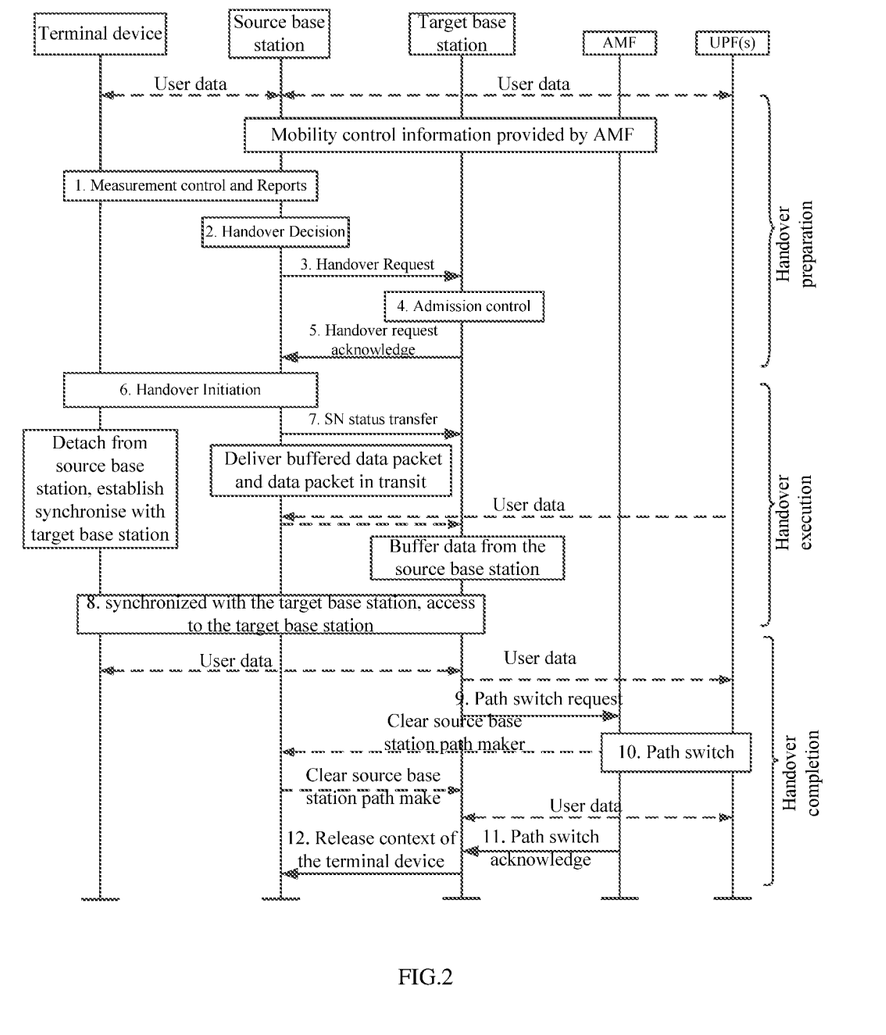
FIG. 2 is a schematic diagram illustrating a cell handover provided by an embodiment of the present disclosure.

For example, the handover procedure may be shown in FIG. 2, and the entire handover procedure is divided into three stages described below.

First stage, Handover Preparation (1~5). In step 1, a terminal device is triggered by a source base station to perform neighbor cell measurement, so that the terminal device can measure neighbor cells and report a measurement result to the source base station.

In step 2, the source base station decides whether to trigger a handover by evaluating the measurement result reported by the terminal device.

In step 3, the source base station sends a handover request to a target base station if it is decided to trigger a handover.

In step 4, after receiving the handover request sent from the source base station, the target base station can start admission according to service information carried by the source base station and perform radio resource configuration.

In step 5, the target base station sends a handover request acknowledge message to the source base station, and returns the admission result and radio resource configuration information in the target base station to the source base station. At this point, the handover preparation stage is completed.

Second stage, Handover Execution (6~8). In step 6, after receiving the handover request acknowledge message from the target base station, the source base station can trigger the terminal device to execute the handover.

In step 7, the source base station can forward buffered data, data packet in transit, system serial number of the data, etc. to the target base station. Further, the target base station can buffer data received from the source base station.

In addition, the terminal device can detach from the source base station and is synchronized to the target base station.

In step 8, the terminal device is synchronized to the target base station. At this point, the handover execution stage is completed.

Third stage, Handover Completion (209~212). In step 9, the target base station sends a path switch request to the Access and Mobility Management Function (AMF).

In step 10, after receiving the path switch request from the target base station, the AMF performs path switch with the User Plane Function (UPF) to clear path marker of the source base station in the user plane.

In step 11, after the path switch is completed, the AMF can send a path switch acknowledge message to the target base station.

In step 12, the target base station sends a terminal device context release message to the source base station to notify the source base station that the handover is successful, and trigger the source base to release the context of the terminal device. At this point, the handover is completed.

It should be understood that, in the embodiments of the present disclosure, as for the problem in high-speed mobile scenarios and high-frequency deployment scenarios that the handover is frequently performed and the handover is easy to fail, it is considered to introduce a conditional handover procedure in the LTE and NR system under the 3rd Generation Partnership Project (3GPP). The basic principle is that the terminal device performs handover to the target cell according to a pre-configured handover command when evaluating, according to conditions configured on the network side, that conditions related to the target cell are triggered (i.e., triggering a random access process and sending handover complete message). In this way, the problem that the terminal device fails to send the measurement report and receive the handover command due to high-speed movement into a poor coverage area is avoided.

Figure 3:
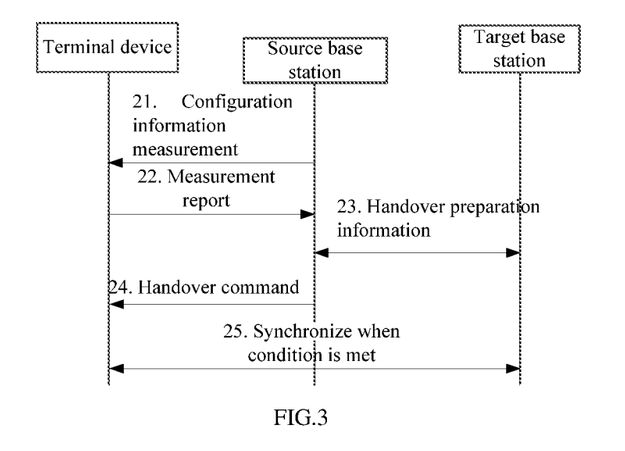
FIG. 3 is a schematic diagram illustrating a conditional handover procedure provided by an embodiment of the present disclosure.

Specifically, as shown in FIG. 3, a conditional handover procedure may include steps described below.

In step 21, a source base station sends measurement configuration information to a terminal device.

In step 22, the terminal device sends a measurement report to the source base station.

In step 23, the source base station and the target base station exchange handover preparation information.

In step 24, the source base station sends a handover command to the terminal device.

The handover command includes condition information on cells or beams.

In step 25, when a condition is met, the terminal device is synchronized with the target base station (the terminal device accesses to the target base station).

In the conditional handover procedure (pre-configured handover procedure), the handover message does not go into effect immediately. For example, the terminal device may be handed over to the target cell after a long time, or the handover fails. In this case, the source cell never receives any response message, which may cause uncertainty in processing for the source cell. Based on the above problem, the present disclosure provides a cell handover method, so that the terminal device can feed back response information to the source cell and/or the target cell in time, and the source cell can also receive the response information in time. Therefore, the source cell can learn the handover process of the terminal device in time.

It should be noted that the embodiments of the present disclosure can be applied to a conditional handover procedure. The cell handover method of the present disclosure will be described below in conjunction with specific embodiments.

Figure 4:
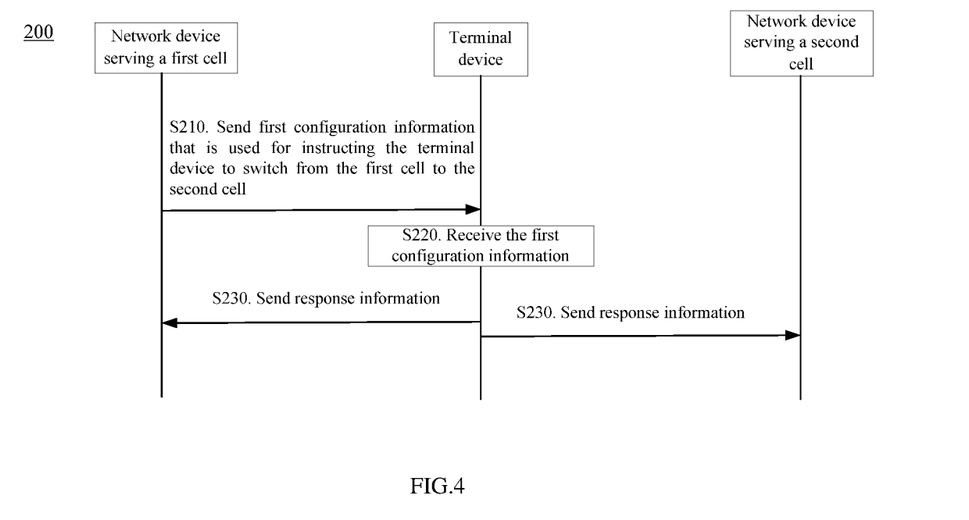
FIG. 4 is a schematic flowchart of a cell handover method provided by an embodiment of the present disclosure.

FIG. 4 is a schematic flowchart of a cell handover method 200 according to an embodiment of the present disclosure. As shown in FIG. 4, the method 200 may include the following contents.

In S210, a network device serving a first cell sends first configuration information to a terminal device. The first configuration information is used to instruct the terminal device to be handed over from the first cell to a second cell.

In S220, the first configuration information is received by the terminal device.

In S230, in response to the first configuration information, the terminal device sends response information to the network device serving the first cell and/or the network device serving the second cell.

It should be noted that the terminal device resides in the first cell, and the network device serving the first cell determines that the terminal device needs to be handed over to the second cell from the first cell, and sends the first configuration information to the terminal device.

Optionally, the first configuration information may be a handover command pre-configured at the network device serving the first cell, that is, the network device serving the first cell can trigger a conditional handover procedure, and send the first configuration information to the terminal device.

Optionally, the method 200 may be applied to a high-speed mobile scenario and/or high-frequency deployment scenario.

It should be noted that, in the embodiments of the present disclosure, the network device serving the first cell and the network device serving the second cell may be the same or different.

Optionally, in the embodiments of the present disclosure, the first configuration information includes condition information on handover from the first cell to the second cell and/or configuration information on the first cell.

It should be noted that the condition information on handover from the first cell to the second cell may be, for example, cell information, beam information, channel information, and the like.

Optionally, in the embodiments of the present disclosure, the terminal device sends the response information to the network device serving the first cell and the network device serving the second cell respectively when a first condition is met.

Optionally, the first condition includes at least one of the following: if the first configuration information includes condition information on handover from the first cell to the second cell; if the first configuration information includes the configuration information on the first cell; and if the first configuration information includes condition information on handover from the first cell to the second cell, and the condition information cannot be met by the terminal device currently.

Optionally, in the embodiments of the present disclosure, the terminal device sends the response information to the network device serving the second cell when a second condition is met.

Optionally, the second condition includes at least one of the following: if the first configuration information includes no condition information on handover from the first cell to the second cell; if the first configuration information include no configuration information on the first cell; and if the first configuration information includes condition information on handover from the first cell to the second cell, and the condition information can be met by the terminal device currently.

Optionally, in the embodiments of the present disclosure, the network device serving the first cell is further configured to instruct the terminal device to perform feedback on the first configuration information. At this time, in the case that the first condition or the second condition is met, the terminal device also needs to send response information to the network device serving the first cell and/or the network device serving the second cell according to the instruction.

For example, the terminal device receives first instruction information sent from the network device serving the first cell, and the first instruction information is used to instruct the terminal device to perform feedback on the first configuration information, and the terminal device sends response information to the network device serving the first cell and/or the network device serving the second cell according to the first instruction information.

As another example, if the first configuration information is further used to instruct the terminal device to perform feedback on the first configuration information, the terminal device sends response information to the network device serving the first cell and/or the network device serving the second cell according to the first configuration information.

Optionally, in the embodiments of the present disclosure, the response information for the network device serving the first cell is used for indicating acceptance of the first configuration information.

Optionally, in the embodiments of the present disclosure, the response information for the network device serving the second cell is used for indicating that the handover is completed.

Specifically, the terminal device may send the response information to the network device serving the second cell in the following situation: the terminal device triggers a random access process to the second cell, and sends response information to the network device serving the second cell.

Optionally, in the embodiments of the present disclosure, before S210, the terminal device sends first information to the network device serving the first cell, and the first information is used for indicating whether the terminal device supports performing cell handover based on a pre-configured handover signaling.

Optionally, in the embodiments of the present disclosure, before S210, the terminal device sends second information to the network device serving the first cell, and the second information is used for indicating whether the terminal device supports sending response information for cell handover to the network device serving the first cell.

Optionally, the first information and the second information may be the same information or different information.

Therefore, in the embodiments of the present disclosure, after the configuration information used to instruct the terminal device to be handed over to the second cell from the first cell has been sent to the terminal device from the network device serving the first cell, the terminal device can timely feed back response information to the network device serving the first cell and/or the network device serving the second cell, so that the network device serving the first cell can receive the response information in time, and thus can learn the handover process of the terminal device in time.

Figure 5:
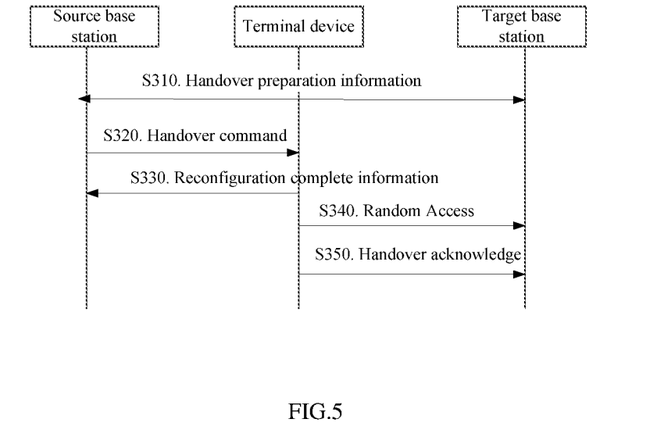
FIG. 5 is a schematic flowchart of a cell handover provided by an embodiment of the present disclosure.

As an example, as shown in FIG. 5, a cell handover method 300 includes steps described below.

In S310, the source base station and the target base station exchange handover preparation information.

It should be noted that the source base station triggers the exchange of handover preparation information with the target base station if it is determined by the source base station that the terminal device needs to be handed over from the source cell to the target cell.

In S320, the source base station sends a handover command to the terminal device.

Optionally, the handover command may be a handover command pre-configured by the source base station, that is, the source base station can trigger a conditional handover procedure and send the handover command to the terminal device.

Optionally, the handover command includes condition information on handover from the source cell to the target cell and/or configuration information on the source cell.

In S330, the terminal device sends reconfiguration complete information to the source base station.

It should be noted that the reconfiguration completion information may be response information indicating the acceptance of the handover command.

Optionally, the terminal device sends the reconfiguration completion information to the source base station when the first condition is met.

Optionally, the first condition includes at least one of the following: if the handover command includes condition information on handover from the source cell to the target cell; if the handover command only includes configuration information on the source cell; if the handover command includes condition information on handover from the source cell to the target cell, and the condition information cannot be met by the terminal device currently.

Optionally, the terminal device receives the first instruction information sent from the source base station, and the terminal device sends the reconfiguration complete information to the source base station according to the first instruction information, where the first instruction information is used to instruct the terminal device to perform feedback on the handover command.

Optionally, if the handover command is further used to instruct the terminal device to perform feedback on the handover command, the terminal device may send the reconfiguration completion information to the source base station according to the handover command.

In S340, the terminal device performs random access.

It should be noted that in this step, the terminal device triggers random access to the target cell for accessing to the target cell.

In S350, the terminal device sends a handover confirmation to the target base station.

It should be noted that the handover confirmation may be response information used for indicating that the handover is completed. That is, the terminal device has successfully been handed over to the target cell.

It should also be noted that after the handover is completed, the terminal device always sends the handover confirmation.

It should be noted that, in the embodiment, S330 can be performed before S340, or be performed after S350, or be performed simultaneously with S350.

Figure 6:
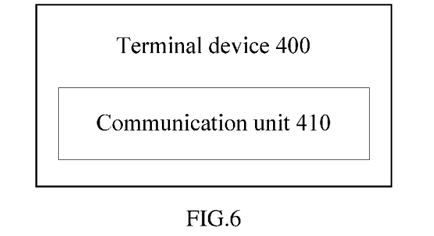
FIG. 6 is a schematic block diagram of a terminal device according to an embodiment of the present disclosure.

FIG. 6 shows a schematic block diagram of a terminal device 400 according to an embodiment of the present disclosure. As shown in FIG. 6, the terminal device 400 includes a communication unit 410.

The communication unit 410 is configured to receive first configuration information sent from a network device serving a first cell. The first configuration information is used to instruct the terminal device to be handed over from the first cell to a second cell.

In response to the first configuration information, the communication unit 410 is further configured to send response information to the network device serving the first cell and/or a network device serving the second cell.

Optionally, the communication unit 410 is specifically configured to send the response information to the network device used for serving the first cell and the network device used for serving the second cell respectively when a first condition is met.

Optionally, the first condition includes at least one of the following: if the first configuration information includes condition information on handover from the first cell to the second cell, if the first configuration information includes the configuration information on the first cell, and if the first configuration information includes condition information on handover from the first cell to the second cell, and the condition information cannot be met by the terminal device currently.

Optionally, the communication unit 410 is specifically configured to send the response information to the network device serving the second cell when a second condition is met.

Optionally, the second condition includes at least one of the following: if the first configuration information includes no condition information on handover from the first cell to the second cell, if the first configuration information includes no configuration information on the first cell, and if the first configuration information includes condition information on handover from the first cell to the second cell, and the condition information can be met by the terminal device currently.

Optionally, the communication unit 410 is further configured to receive first instruction information sent from the network device serving the first cell, where the first instruction information is used to instruct the terminal device to perform feedback on the first configuration information.

The communication unit 410 is specifically configured to send the response information to the network device serving the first cell and the network device serving the second cell according to the first instruction information.

Optionally, if the first configuration information is further used to instruct the terminal device to perform feedback on the first configuration information, the communication unit 410 is specifically configured to send the response information to the network device serving the first cell and the network device serving the second cell according to the first configuration information.

Optionally, the response information for the network device serving the first cell is used for indicating acceptance of the first configuration information.

Optionally, the response information for the network device serving the second cell is used for indicating that the handover is completed.

Optionally, the communication unit 410 is specifically configured to trigger a random access process to the second cell, and send response information to the network device serving the second cell.

Optionally, the communication unit 410 is further configured to send first information to the network device serving the first cell. The first information is used for indicating whether the terminal device supports performing cell handover based on a pre-configured handover signaling.

Optionally, the communication unit 410 is further configured to send second information to the network device serving the first cell. The second information is used for indicating whether the terminal device supports sending response information for cell handover to the network device serving the first cell.

Optionally, the terminal device 400 is applied to a high-speed mobile scenario and/or high-frequency deployment scenario.

It should be understood that the terminal device 400 according to the embodiments of the present disclosure may correspond to the terminal device in the method embodiments of the present disclosure, and the above and other operations and/or functions of each unit in the terminal device 400 are to implement the corresponding process of the terminal device in the method 200 shown in FIG. 4, respectively. For the sake of brevity, it is not repeated here.

Figure 7:
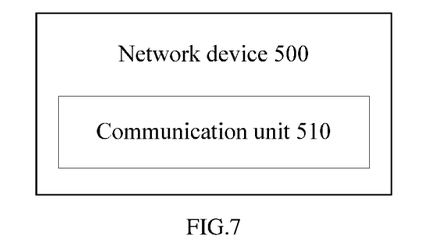
FIG. 7 is a schematic block diagram of a network device according to an embodiment of the present disclosure.

FIG. 7 is a schematic block diagram of a network device 500 according to an embodiment of the present disclosure. As shown in FIG. 7, the network device 500 is configured to serve the first cell, and the network device 500 includes a communication unit 510.

The communication unit 510 is configured to send first configuration information to a terminal device, where the first configuration information is used to instruct the terminal device to be handed over from a first cell to a second cell.

The communication unit 510 is further configured to receive response information sent from the terminal device, where the response information is used for indicating acceptance of the first configuration information.

Optionally, the communication unit 510 is specifically configured to receive the response information sent from the terminal device when a first condition is met.

Optionally, the first condition includes at least one of the following: if the first configuration information includes condition information on handover from the first cell to the second cell, if the first configuration information includes the configuration information on the first cell, and if the first configuration information includes condition information on handover from the first cell to the second cell, and the condition information cannot be met by the terminal device currently.

Optionally, the communication unit 510 is specifically configured to: if the first configuration information includes condition information on handover from the first cell to the second cell, and the condition information cannot be met by the terminal device currently, receive the response message sent from the terminal device.

Optionally, the communication unit 510 is specifically configured to: receive the response information sent from the terminal device if the first configuration information only includes configuration information on the first cell.

Optionally, the communication unit 510 is further configured to send first instruction information to the terminal device, where the first instruction information is used to instruct the terminal device to perform feedback on the first configuration information.

Optionally, the first configuration information is further used to instruct the terminal device to perform feedback on the first configuration information.

Optionally, the communication unit 510 is further configured to receive first information sent from the terminal device. The first information is used for indicating whether the terminal device supports performing cell handover based on pa re-configured handover signaling.

Optionally, the communication unit 510 is further configured to receive second information sent from the terminal device. The second information is used for indicating whether the terminal device supports sending response information for cell handover to the network device.

Optionally, the network device 500 is applied to a high-speed mobile scenario and/or high-frequency deployment scenario.

It should be understood that the network device 500 according to the embodiments of the present disclosure may correspond to the network device in the method embodiments of the present disclosure, and the above and other operations and/or functions of each unit in the network device 500 are to implement the corresponding process of the network device serving the first cell in the method 200 shown in FIG. 4, respectively. For the sake of brevity, it is not repeated here.

Figure 8:
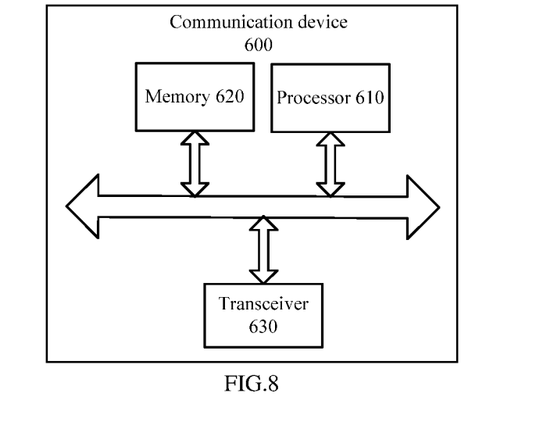
FIG. 8 is a schematic block diagram of a communication device according to an embodiment of the present disclosure.

FIG. 8 is a schematic structural diagram of a communication device 600 provided by an embodiment of the present disclosure. The communication device 600 shown in FIG. 8 includes a processor 610. The processor 610 may call a computer program from a memory and run the computer program to implement the method provided in the embodiments of the present disclosure.

Optionally, as shown in FIG. 8, the communication device 600 may further include a memory 620. The processor 610 may call the computer program from the memory 620 and run the computer program to implement the method provided in the embodiments of the present disclosure.

The memory 620 may be a device separated from the processor 610, or may be integrated into the processor 610.

Optionally, as shown in FIG. 8, the communication device 600 may further include a transceiver 630, and the processor 610 may control the transceiver 630 to communicate with other devices. Specifically, the transceiver 630 may send information or data to other devices, or receive information or data sent from other devices.

The transceiver 630 may include a transmitter and a receiver. The transceiver 630 may further include antennas, and the number of antennas may be one or more.

Optionally, the communication device 600 may be the network device serving the first cell in the embodiments of the present disclosure, and may implement the corresponding process implemented by the network device serving the first cell in each method of the embodiments of the present disclosure. For the sake of brevity, details are not repeated here.

Optionally, the communication device 600 may be the mobile terminal/terminal device of the embodiments of the present disclosure, and may implement the corresponding process implemented by the mobile terminal/terminal device in each method of the embodiments of the present disclosure. For the sake of brevity, details are not repeated here.

Figure 9:
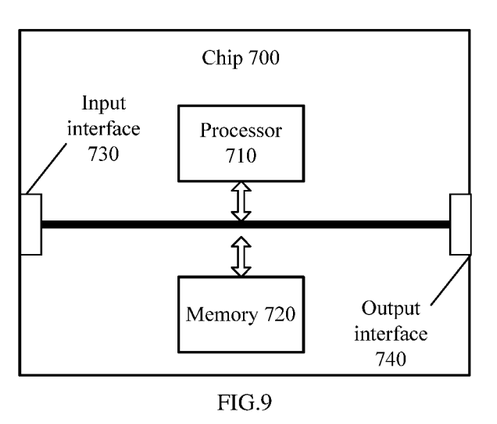
FIG. 9 is a schematic block diagram of a chip according to an embodiment of the present disclosure.

FIG. 9 is a schematic structural diagram of a chip provided by an embodiment of the present disclosure. The chip 700 shown in FIG. 9 includes a processor 710. The processor 710 may call a computer program from a memory and run the computer program to implement the method provided in the embodiments of the present disclosure.

Optionally, as shown in FIG. 9, the chip 700 may further include a memory 720. The processor 710 may call the computer program from the memory 720 and run the computer program to implement the method provided in the embodiments of the present disclosure.

The memory 720 may be a device separated from the processor 710, or may be integrated into the processor 710.

Optionally, the chip 700 may further include an input interface 730. The processor 710 can control the input interface 730 to communicate with other devices or chips, and specifically, can obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip may be applied to the network device serving the first cell in the embodiments of the present disclosure, and may implement the corresponding process implemented by the network device serving the first cell in each method of the embodiments of the present disclosure. For the sake of brevity, details are not repeated here.

Optionally, the chip may be applied to the mobile terminal/terminal device of the embodiments of the present disclosure, and may implement the corresponding process implemented by the mobile terminal/terminal device in each method of the embodiments of the present disclosure. For the sake of brevity, details are not repeated here.

It should be understood that the chip described in embodiments of the present disclosure can also be referred to as a system-level chip, system chip, chip system, or system-on-chip and so on.

Figure 10:
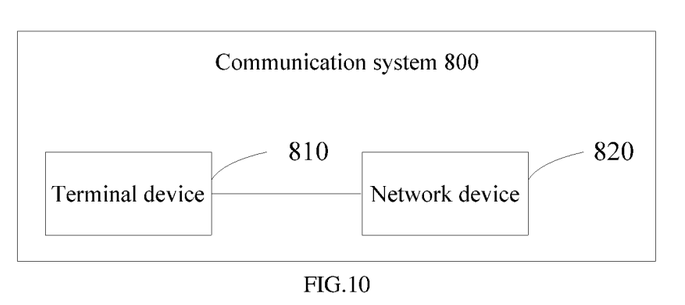
FIG. 10 is a schematic block diagram of a communication system according to an embodiment of the present disclosure.

FIG. 10 is a schematic block diagram illustrating a communication system 800 provided by an embodiment of the present disclosure. As shown in FIG. 10, the communication system 800 includes a terminal device 810 and a network device 820.

The terminal device 810 may implement corresponding functions performed by the terminal device in methods described above, and the network device 820 may implement corresponding functions performed by the network device serving the first cell in the methods described above. For the sake of brevity, details are not repeated here.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an disclosure specific integrated circuit (ASIC), a field programmable gate array (FPGA) or other programmable logic devices, discrete gates or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. The non-volatile memory can be read-only memory (ROM), programmable read-only memory (PROM), erasable programmable read-only memory (EPROM), and Electrically Erasable programmable read-only memory (EEPROM) or flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than limitation. For example, the memory in the embodiments of the present disclosure may be a static RAM (SRAM), a dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories in the embodiments of the present disclosure are intended to include, but are not limited to, these memories and any other suitable types of memories.

The embodiments of the present disclosure further provide a storage medium for storing computer programs.

Optionally, the computer-readable storage medium can be applied to the network device provided in the embodiments of the present disclosure, and the computer programs cause the computer to execute the corresponding process implemented by the network device in each method of the embodiments of the present disclosure. For the sake of brevity, descriptions are not repeated here.

Optionally, the computer-readable storage medium can be applied to the mobile terminal/terminal device in the embodiments of the present disclosure, and the computer programs cause the computer to execute the corresponding process implemented by the mobile terminal/terminal device in each method of the embodiments of the present disclosure. For the sake of brevity, descriptions are not repeated here.

The embodiments of the present disclosure further provide a computer program product including computer program instructions.

Optionally, the computer program product may be applied to the network device provided in the embodiments of the present disclosure, and the computer program instructions cause the computer to execute the corresponding process implemented by the network device in each method of the embodiments of the present disclosure. For brevity, details are not described herein again.

Optionally, the computer program product may be applied to the mobile terminal/terminal device provided in the embodiments of the present disclosure, and the computer program instructions cause the computer to execute the corresponding process implemented by the mobile terminal/terminal device in each method of the embodiments of the present disclosure. For brevity, details are not described herein again.

The embodiments of the present disclosure further provide a computer program.

Optionally, the computer program can be applied to the network device provided in the embodiments of the present disclosure. The computer program, when executed on the computer, causes the computer to execute the corresponding process implemented by the network device in each method of the embodiments of the present disclosure. For the sake of brevity, descriptions are not repeated here.

Optionally, the computer program can be applied to the mobile terminal/terminal device in the embodiments of the present disclosure. The computer program, when executed on the computer, causes the computer to execute the corresponding process implemented by the mobile terminal/terminal device in each method of the embodiments of the present disclosure. For the sake of brevity, descriptions are not repeated here.

Those ordinary skilled in the art may realize that the units and algorithm steps of the examples described in combination with the embodiments can be implemented by electronic hardware or a combination of computer software and electronic hardware. Whether these functions are executed by hardware or software depends on the specific disclosure and design constraints of the technical solution. Professionals and technicians can use different methods for each specific disclosure to implement the described functions, but such implementation should not be considered beyond the scope of present disclosure.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative. For example, the division of the units is only a logical function division, and there may be other divisions in actual implementation, for example, multiple units or components may be combined or It can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

If the function is implemented in the form of a software functional unit and sold or used as an independent product, it can be stored in a computer readable storage medium. In view of this, the part of the technical solution of this disclosure in essence or that contributes to the prior art or the part of the technical solution can be embodied in the form of a software product, and the computer software product is stored in a storage medium. The storage medium include several instructions so that a computer (which may be a personal computer, a server, or a network device, etc.) executes all or part of the steps of the methods described in the various embodiments of the present disclosure. The aforementioned storage medium includes U disk, mobile hard disk drive, Read-Only Memory (ROM), Random Access Memory (RAM), magnetic disks or optical disks and other media that can store program codes.

The foregoing descriptions are merely exemplary implementations of the present disclosure, but the protection scope of the present disclosure is not limited thereto. Any changes or substitutions easily conceived by those skilled in the art based on the contents of the present disclosure fall within the protection scope of the present disclosure. Therefore, the protection scope of the present disclosure shall be defined by the appended claims.

What is claimed is:

1. A method for cell handover applied to a conditional handover procedure, comprising:
   receiving, by a terminal device, first configuration information sent from a network device serving a first cell, wherein the first configuration information is used to instruct the terminal device to be conditionally handed over from the first cell to a second cell;
   sending, by the terminal device, first response information to the network device serving the first cell; and
   sending, by the terminal device, second response information to a network device serving the second cell,
   wherein the method further comprising:
   after a first condition is met, sending, by the terminal device, the first response information to the network device serving the first cell, and/or sending, by the terminal device, the second response information to the network device serving the second cell;
   wherein the first condition comprises
   the first configuration information including condition information on handover from the first cell to the second cell, and the condition information snot met by the terminal device currently,
   wherein the first response information for the network device serving the first cell is used for indicating acceptance of the first configuration information.

2. The method according to claim 1, wherein in response to a second condition being met, the second response information is sent, by the terminal device, to the network device serving the second cell;
   wherein the second condition comprises at least one of the following:
   if the first configuration information comprises no condition information on handover from the first cell to the second cell;
   if the first configuration information comprises no configuration information on the first cell; and
   if the first configuration information comprises condition information on handover from the first cell to the second cell, and the condition information is met by the terminal device currently.

3. The method according to claim 1, further comprising:
   receiving, by the terminal device, first instruction information sent from the network device serving the first cell, wherein the first instruction information is used to instruct the terminal device to perform feedback on the first configuration information,
   wherein the first response information and the second response information are respectively sent to the network device serving the first cell and the network device serving the second cell according to the first instruction information.

4. The method according to claim 1, wherein the first configuration information is further used to instruct the terminal device to perform feedback on the first configuration information,
   wherein the first response information and the second response information are respectively sent to the network device serving the first cell and the network device serving the second cell according to the first configuration information.

5. The method according to claim 1, wherein the second response information for the network device serving the second cell is used for indicating that the handover is completed.

6. The method according to claim 1, wherein the second response information is sent to the network device serving the second cell through:
   triggering, by the terminal device, an random access process to the second cell; and
   sending the second response information to the network device serving the second cell.

7. The method according to claim 1, further comprising:
   sending, by the terminal device, first information to the network device serving the first cell, wherein the first information is used for indicating whether the terminal device supports performing cell handover based on a pre-configured handover signaling.

8. The method according to claim 1, further comprising:
   sending, by the terminal device, second information to the network device serving the first cell, wherein the second information is used for indicating whether the terminal device supports sending response information for cell handover to the network device serving the first cell.

9. The method according to claim 1, wherein the method is applied to at least one of a high-speed mobile scenario or a high-frequency deployment scenario.

10. A terminal device applied to a conditional handover procedure, comprising: a processor and a memory, wherein the memory is configured to store a computer program, and the processor is configured to call the computer program stored in the memory and run the computer program to:
    receive first configuration information sent from a network device serving a first cell, wherein the first configuration information is used to instruct the terminal device to be conditionally handed over from the first cell to a second cell;

send first response information to the network device serving the first cell; and send second response information to a network device serving the second cell, wherein the processor is further configured to: after a first condition is met, send the first response information to the network device serving the first cell; and/or send the second response to the network device serving the second cell, wherein the first condition comprises the first configuration information including condition information on handover from the first cell to the second cell, and the condition information is not met by the terminal device currently, wherein the first response information for the network device serving the first cell is used for indicating acceptance of the first configuration information.

11. The terminal device according to claim 10, wherein the processor is further configured to:

send the second response information to the network device serving the second cell in response to a second condition being met, wherein the second condition comprises at least one of the following:

if the first configuration information comprises no condition information on handover from the first cell to the second cell;

if the first configuration information comprises no configuration information on the first cell; and if the first configuration information comprises condition information on handover from the first cell to the second cell, and the condition information is met by the terminal device currently.

12. The terminal device according to claim 10, wherein the second response information for the network device serving the second cell is used for indicating that the handover is completed.

13. The terminal device according to claim 10, wherein the processor is further configured to send first information to the network device serving the first cell, wherein the first information is used for indicating whether the terminal device supports performing cell handover based on a pre-configured handover signaling.

14. A network device, applied to a conditional handover procedure, serving a first cell and comprising: a processor and a memory, wherein the memory is configured to store a computer program, and the processor is configured to call the computer program stored in the memory and run the computer program, to:

send first configuration information to a terminal device, wherein the first configuration information is used to instruct the terminal device to be conditionally handed over from the first cell to a second cell; and receive response information sent from the terminal device, wherein the response information is used for indicating acceptance of the first configuration information, wherein the processor is further configured to: after a first condition is met, receive the response information sent from the terminal device;

wherein the first condition comprises the first configuration information including condition information on handover from the first cell to the second cell, and the condition information is not met by the terminal device currently.

15. The network device according to claim 14, wherein the processor is further configured to receive first information sent from the terminal device, wherein the first information is used for indicating whether the terminal device supports performing cell handover based on a pre-configured handover signaling.

* * * * *